United States Patent
Smits

(10) Patent No.: US 10,494,058 B2
(45) Date of Patent: Dec. 3, 2019

(54) METHOD FOR MANUFACTURING A LAMINAR CONSTRUCTION PANEL

(71) Applicant: Isoleermaterialenindustrie Pull B.V., Rhenen (NL)

(72) Inventor: Sander Smits, Rhenen (NL)

(73) Assignee: Isoleermaterialenindustrie Pull B.V., Rhenen (NL)

( * ) Notice: Subject to any disclaimer, the term of this patent is extended or adjusted under 35 U.S.C. 154(b) by 780 days.

(21) Appl. No.: 15/021,036

(22) PCT Filed: Sep. 17, 2014

(86) PCT No.: PCT/NL2014/000031
§ 371 (c)(1),
(2) Date: Mar. 10, 2016

(87) PCT Pub. No.: WO2015/047081
PCT Pub. Date: Apr. 2, 2015

(65) Prior Publication Data
US 2016/0221643 A1    Aug. 4, 2016

(30) Foreign Application Priority Data

Sep. 26, 2013 (NL) ..................... 1040411

(51) Int. Cl.
*B63B 3/20*    (2006.01)
*E04C 2/292*    (2006.01)
(Continued)

(52) U.S. Cl.
CPC .............. *B63B 3/20* (2013.01); *B23K 11/115* (2013.01); *B23K 11/20* (2013.01); *B32B 7/04* (2013.01);
(Continued)

(58) Field of Classification Search
CPC ................. Y10T 428/17–18; B32B 15/00–20
See application file for complete search history.

(56) References Cited

U.S. PATENT DOCUMENTS 2,413,370 A * 12/1946 Palmer ............... B23K 35/0288
219/99
2,467,379 A *  4/1949 Graham .................. B23K 9/22
219/95

(Continued)

FOREIGN PATENT DOCUMENTS

| EP | 0616987 | 9/1994 |
|---|---|---|
| EP | 1880841 | 1/2008 |
| JP | 2001138055 A * | 5/2001 |

*Primary Examiner* — Ibrahime A Abraham
*Assistant Examiner* — Elizabeth M Sims
(74) *Attorney, Agent, or Firm* — Gable Gotwals

(57) ABSTRACT

A method for manufacturing a laminar construction panel comprising a first (1) and a second (2) metal plate and an acoustic insulation layer (3) interposed there between. The first and second metal plates are connected to each other by a number of locally welded joints distributed over the laminar construction panel and extended through an area of an acoustic isolation layer. The welded joints are formed by stud welding, one of the metal plates is provided with welding openings (4), and a welding pin (7) is pushed through the isolation layer against the other metal plate. The welded joints may be formed by spot welding, both metal plates are brought into electrical connection with the spot welding equipment, and the metal plates locally are pressed toward each other in such a way that mutual electrical contact is made.

7 Claims, 5 Drawing Sheets

Figure 1:
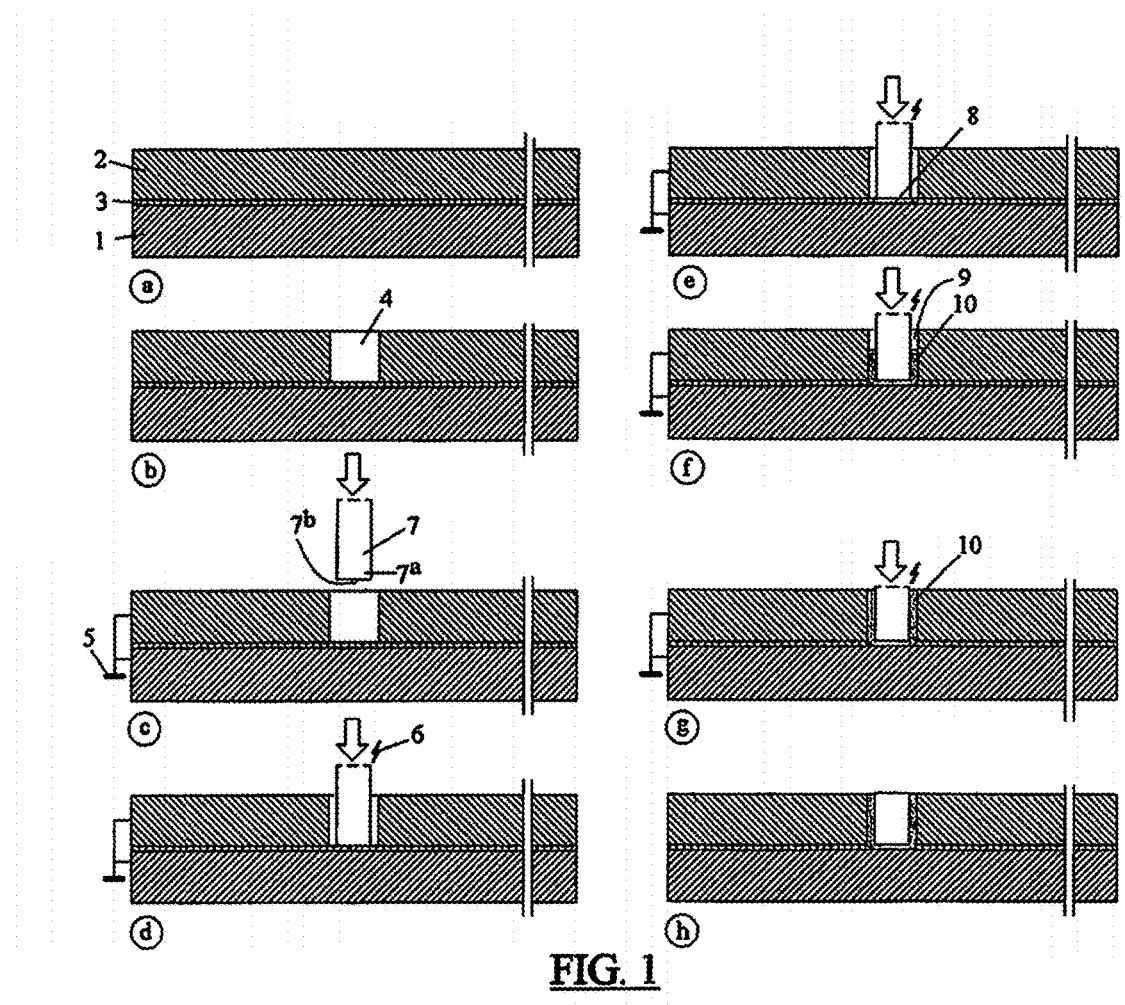

(51) Int. Cl.
    *B63B 17/00* (2006.01)
    *B32B 7/04* (2019.01)
    *B32B 15/04* (2006.01)
    *B63B 3/68* (2006.01)
    *E04B 1/84* (2006.01)
    *B63B 5/24* (2006.01)
    *B23K 11/11* (2006.01)
    *B32B 15/01* (2006.01)
    *B23K 11/20* (2006.01)
    *B63B 15/00* (2006.01)
    *B63B 3/14* (2006.01)
    *B32B 15/18* (2006.01)

(52) U.S. Cl.
    CPC ............ *B32B 15/01* (2013.01); *B32B 15/011* (2013.01); *B32B 15/043* (2013.01); *B32B 15/18* (2013.01); *B63B 3/14* (2013.01); *B63B 3/68* (2013.01); *B63B 15/00* (2013.01); *B63B 17/0081* (2013.01); *E04C 2/292* (2013.01); *B32B 2605/12* (2013.01); *B63B 2005/245* (2013.01); *E04B 2001/8461* (2013.01)

(56) References Cited

U.S. PATENT DOCUMENTS

| | | | | |
|---|---|---|---|---|
| 3,306,642 A * | 2/1967 | Arnold | B23K 5/10 | 228/190 |
| 3,629,544 A * | 12/1971 | Becker | B23K 11/163 | 219/78.14 |
| 3,757,482 A * | 9/1973 | Haeussler | E04C 2/044 | 52/405.3 |
| 3,858,024 A * | 12/1974 | Hinden | B23K 11/002 | 219/119 |
| 3,989,919 A * | 11/1976 | Wefers | B23K 11/14 | 219/94 |
| 4,614,855 A * | 9/1986 | Hinden | B23K 11/0046 | 219/86.9 |
| 4,855,562 A * | 8/1989 | Hinden | B23K 35/0288 | 219/93 |
| 4,865,894 A * | 9/1989 | Shubow | B32B 13/12 | 428/59 |
| 5,426,905 A * | 6/1995 | Rollhauser | A62C 2/06 | 411/396 |
| 5,997,782 A * | 12/1999 | Kopf | B32B 5/26 | 264/45.8 |
| 6,497,543 B1 * | 12/2002 | Lyons | B23K 35/0288 | 219/98 |
| 7,784,165 B2 * | 8/2010 | Xiao | B32B 1/00 | 181/290 |
| 8,176,690 B2 * | 5/2012 | Stanley | E04B 1/14 | 52/274 |
| 2001/0035266 A1 * | 11/2001 | Kennedy | B32B 15/06 | 156/331.4 |
| 2006/0134450 A1 * | 6/2006 | Sigler | B23K 11/11 | 428/621 |
| 2006/0162279 A1 * | 7/2006 | Bergan | B32B 15/04 | 52/783.1 |
| 2009/0226755 A1 * | 9/2009 | Sigler | C22C 18/00 | 428/626 |
| 2010/0147818 A1 * | 6/2010 | Fondriest | B23K 9/0026 | 219/137 WM |
| 2011/0076092 A1 * | 3/2011 | Joh | B63B 3/68 | 403/42 |

* cited by examiner

METHOD FOR MANUFACTURING A LAMINAR CONSTRUCTION PANEL

CROSS-REFERENCE TO RELATED APPLICATIONS

This application is the United States National Phase of PCT Application No. PCT/NL2014/000031 filed 17 Sep. 2014, which claims priority to Netherlands Patent Application No. 1040411 filed 26 Sep. 2013, each of which is incorporated herein by reference.

The invention relates to a method for manufacturing a laminar construction panel. In particular, it relates to construction panels with sound insulating properties for use in shipbuilding.

To date, the bow, decks and bulkheads of ships often are made of 5-8 mm steel/aluminum. In particular in a vessel made of such sheet material, vibration of the engines, air conditioning and other equipment travels far. In order to dampen vibrations currently "anti-drumming paste" is applied against the metal walls and decks of the ship. Upon the paste metal "tiles" are adhered. The whole method is known as "constrained layer damping". This known method requires a lot of "on-site" manual work at the shipyard during the construction of the ship.

The present invention is based on the idea of providing the construction plates combined as "constrained layer damping" panels. For example according to the idea, an 8 mm steel plate is now provided as a laminate (assembly) comprising two steel plates having a symmetric (for example, two times 4 mm) or asymmetric (for example, 3 and 5 mm) configuration, and a thin (for example, thinner than 1 mm) intermediate layer (for example visco-elastic) interposed there between. Consequently, the total thickness of the plate assembly changes thereby hardly or not at all. Tests have shown that the damping properties of this laminar material are significantly better, compared to the current method (of on-site glued tiles). There is a problem however when there's a fire on the ship, because the intermediate layer may disintegrate (pulverise) and lose its adhesion. This possible delamination makes the laminated metal panel significantly weaker, causing this particular construction to fail during fire.

In order to prevent failure, a method is provided, which creates mechanical connecting points between the two metal plates, distributed over their surface, which maintains the stability of the laminate during a fire in spite of any disintegration of the intermediate layer. It is required that the mechanical connections are implemented blindly, so that no holes are created through and into the outside walls, inside walls and decks of the ship.

Accordingly a method for manufacturing a laminar construction panel is provided, comprising a first metal plate, a second metal plate, and an acoustic insulation layer, preferably visco-elastic, interposed there between, wherein the first metal plate and the second metal plate are connected to each other by means of a plurality of locally welded joints, that are (more or less regularly) distributed over the laminar construction panel, and which welded joints extend through the area of the acoustic insulation layer.

In a first preferred embodiment of the method for manufacturing a laminar construction panel comprising a first and a second metal plate and an acoustic insulation layer interpose between the metal plates, the locally welded joints are formed by means of stud, pin or wire welding.

The first preferred method preferably comprises the following steps:

providing said first metal plate, acoustic insulation layer and second metal plate, wherein the second metal plate has been or is provided with openings, hereinafter referred to as welding openings, at locations where the locally welded joints will be provided;

providing electrical stud welding or another suitable welding current source, of which a first welding current connection is electrically connected to the first metal plate and/or the second metal plate, and the equipment furthermore is provided with a welding pin or welding stud, hereinafter referred to as welding pin, to be connected with the second welding current connection, the pin having a cross section which is smaller than the cross section of the welding openings;

performing a stud welding action for each welding opening, wherein the welding pin is inserted into the welding opening, subsequently pushed through the underlying acoustic isolation layer, and pressed onto the metal surface of the first metal plate, in such a way that a welding current flows through the welding pin and the first metal plate, thereby melting and joining together the metal of the welding pin and the first metal plate by that welding current, which stud welding action is continued until the space between the welding pin and the welding opening at least for the most part is filled with molten metal of the welding pin and the first and/or second metal plate.

In a second preferred embodiment of the method according to the invention the locally welded joints are formed by means of spot welding.

The second preferred method preferably comprises the following steps:

providing said first metal plate, acoustic insulation layer and second metal plate, providing of electrical spot welding equipment and then performing a spot welding action for each locally welded joint, wherein the first and the second metal plate are brought into electrical connection with a first and a second welding current connection of the spot welding equipment, and the first and second metal plate locally are pressed towards each other, for example by using at least one spot welding electrode or any other spot pressure body at the predetermined location of the welded joint, in such a way that mutual electrical contact is made, so that a local welding current occurs between the metal sheets, and that both metal plates are welded together at those locations.

When (im)pressing (indenting) the metal sheets, by one or two spot pressure members or spot welding electrodes, the intermediate (preferably visco-elastic) acoustic insulation layer locally is pressed away from between the metal plates, so that the metal plates electrically contact each other. During the occurrence of the welding current—which is supplied by the spot welding equipment—that welds the metal plates together, the acoustic insulation layer in the immediate vicinity of the welding location may burn and/or volatize.

In order to further enhance the reliability of the spot welding process, preferably use is being made of an acoustic insulation layer—at least at the predetermined location of the welded joint—which possesses electrically non-insulating or in other words more or less electrically conducting properties, for example, by mixing conducting particles into the material of the acoustic insulation layer.

As an alternative for the use of an acoustic insulation material with electrically conductive properties, an acoustic insulation layer comprising openings at the predetermined locations of the spot welded joints is used, through which openings the metal plates are pressed against each other, so that mutual electrical contact is obtained between the plates.

Summarized, in the first preferred embodiment of the method use is being made of welding studs (or the ends of welding pins or wire) which are inserted into openings, which beforehand are provided in one of the metal plates and optionally also in the acoustic insulation layer, after which these openings are closed by welding; while in the second preferred embodiment, use is being made of spot welding (without the use of welding studs, rods or wire), wherein the metal plates each are connected to a terminal of a current source and pressed against each other at the predetermined connecting locations in order to provide mutual contact and subsequently weld the plates together.

Preferably, —prior to the application of the locally welded joints or after that—the outer edges of the two metal plates, whether or not integral, are welded together.

A substantial saving in weight can be obtained by using the laminar construction panel obtained by a method according to the invention (up to 19 kg per square meter), and enhanced noise reduction (see FIG. 5), and a considerable saving in labor. In addition, it is possible to apply this laminar construction panel into the entire structure (of for example a vessel), including the load-bearing structures such as decks, ships' walls, etc.

The invention will be discussed in more detail below with reference to the following description of the figures.

Figure 5:
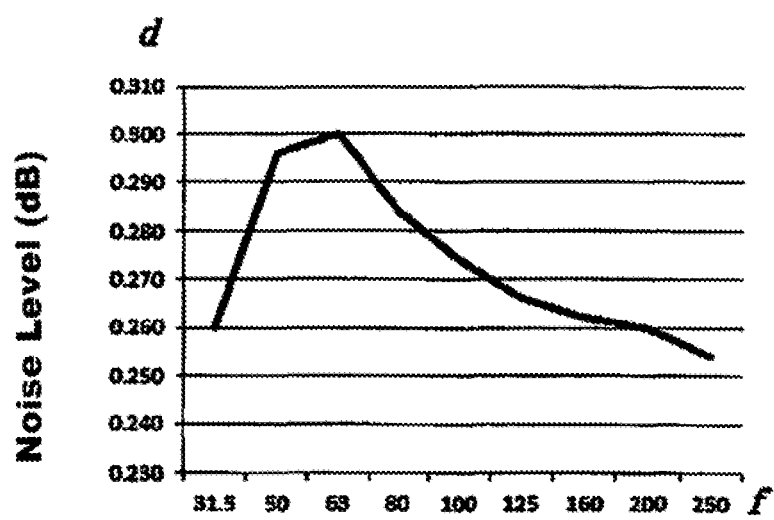

FIGS. 1a-h schematically illustrate the first preferred embodiment of the method according to the invention;

FIGS. 2a-f schematically illustrate the second preferred embodiment of the method according to the invention;

FIGS. 3a-f schematically illustrate an alternative elaboration of the second preferred embodiment of the method according to the invention;

FIGS. 4a-f schematically illustrate the same alternative elaboration of the second preferred embodiment, however in a slightly different embodiment;

FIG. 5 shows a graph of the noise reduction achieved by the invention.

FIGS. 1a-h illustrate stepwise the method according to the invention for manufacturing a laminar construction panel, comprising a first metal plate 1, a second metal plate 2, and an acoustic insulation layer 3 interposed between the metal plates. Furthermore metal connection elements 7 are provided, which are extending through the acoustic insulation layer 3 after performing the method, and which form a strong (and fire resistant) connection between the first and second metal plate.

The embodiment shown in FIGS. 1a-h of the method comprises:
providing said first metal plate 1, acoustic insulation layer 3 and second metal plate 2, wherein the second metal plate (prior) has been or is provided (afterwards) with openings, hereinafter referred to as welding openings 4, at locations where the locally welded joints will be fixed (FIGS. 1a-b). The welding openings 4 can be provided either before bringing together both metal plates 1 and 2, or after combining the plates, as is illustrated by FIGS. 1a-b.
providing electrical stud welding equipment (not shown), of which a first welding current connection, usually the earth connection 5, is electrically connected to the first metal plate 1 and/or the second metal plate 2 (FIG. 1c).
providing a metal welding pin 7 having a cross section which is smaller than the cross section of the welding openings 4 (FIG. 1c).
performing a stud welding action for each welding opening 4, wherein the free outer end 7a (lower outer end) of the welding pin 7 is inserted into the welding opening, and subsequently pushed through the underlying acoustic isolation layer 3 and pressed onto the metal surface of the first metal plate 1 (FIG. 1d). It may be necessary to provide the welding pin 7 with an ignition point 7b, however, this feature is not essential because, in particular, the acoustic insulation layer has viscous properties. The welding pin 7 is electrically connected to the second welding current connection 6 of the electric welding equipment so that, after activation of the stud welding equipment, the stud welding equipment supplies a welding current, which flows through the welding pin 7 and the first metal plate 1. As a result, the welding current causes melting of the metal of the welding pin 7 and of the first metal plate 1, and these molten metals join together, initially in the area 8 between the outer end of the welding pin 7 and the (top) surface of the first metal plate (FIG. 1e).
continuation of the stud welding action—caused by the welding current and the pressure on the welding pin 7 (see downwards arrow)—whereby the (side) space 9 between the welding pin 7 and the welding opening 4 is also filled with molten metal 10 from the welding pin 7 and from the first and second metal plate (FIG. 1f-g).
finally, the welding current is switched off, whereupon the top side of the welding pin 7 can be flattened or levelled—if necessary—(FIG. 1h).

For the welding pin 7 either (relatively short) pins are used for each individual welded joint, always one pin for each welded joint, or use can be made—see the dotted top line of the welding pin above in the figures—of a continuous welding pin or welding wire, which is cut off, after the spaces 8 and 9 are filled with molten metal 10 and the welding current is switched off (at the same time the top surface of the second metal plate 2 may be flattened) after which the (cut off) welding pin is subsequently used as the welding pin for the next stud weld connection at another connection location of the laminar construction panel.

FIGS. 2a-f and 3a-f both schematically illustrate a second preferred embodiment of the method according to the invention, wherein the locally welded joints are not formed by means of stud, pin or wire welding, but by spot welding.

Figure 2:
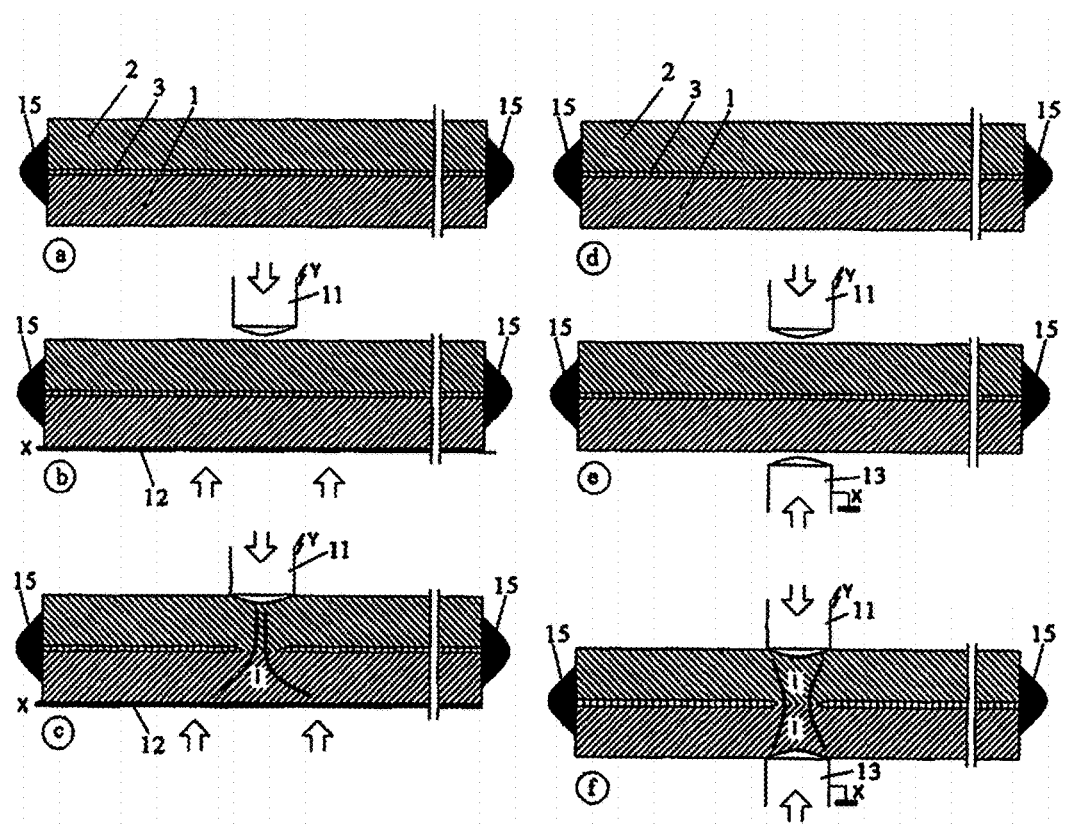
Figure 3:
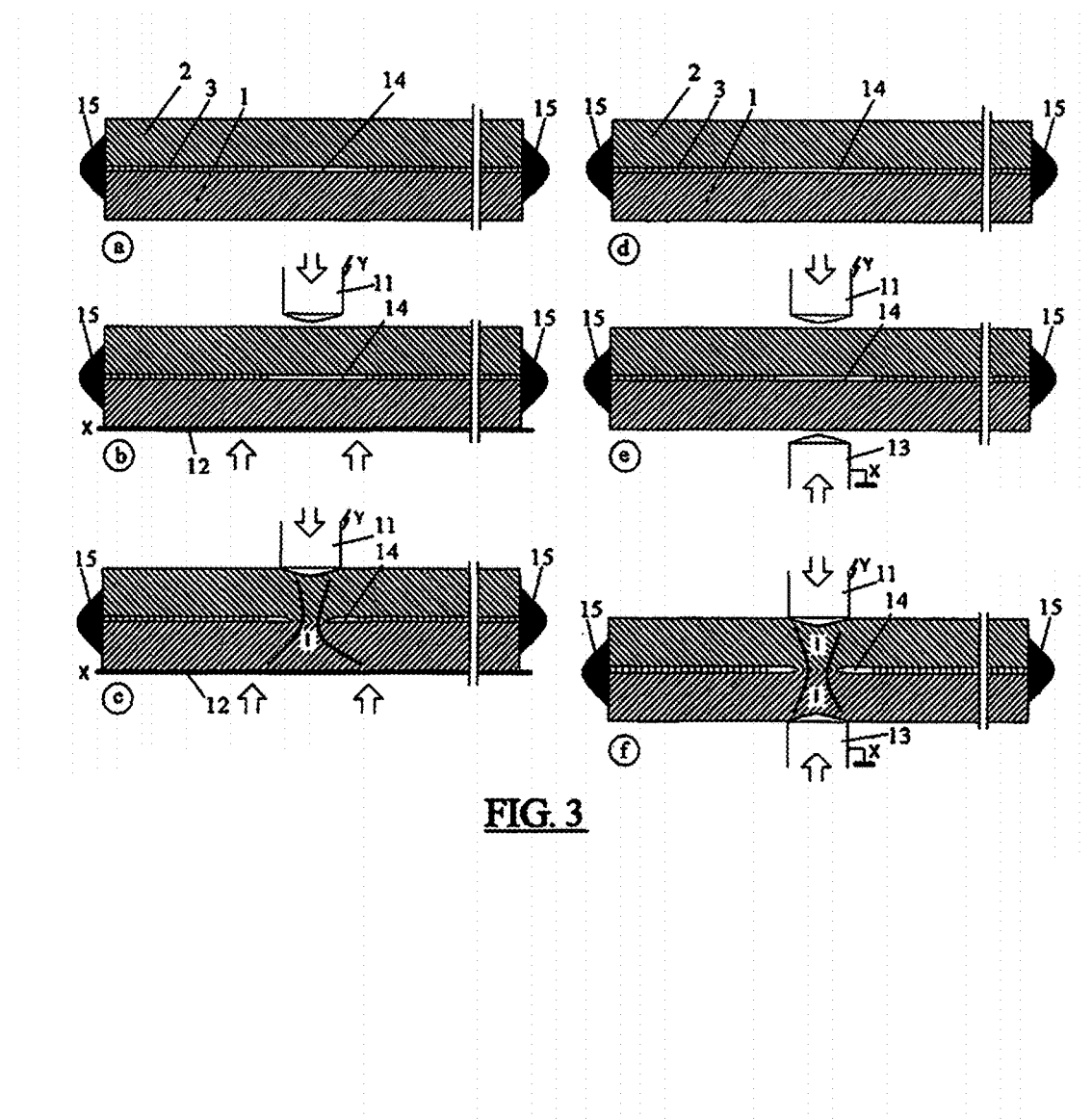
Figure 4:
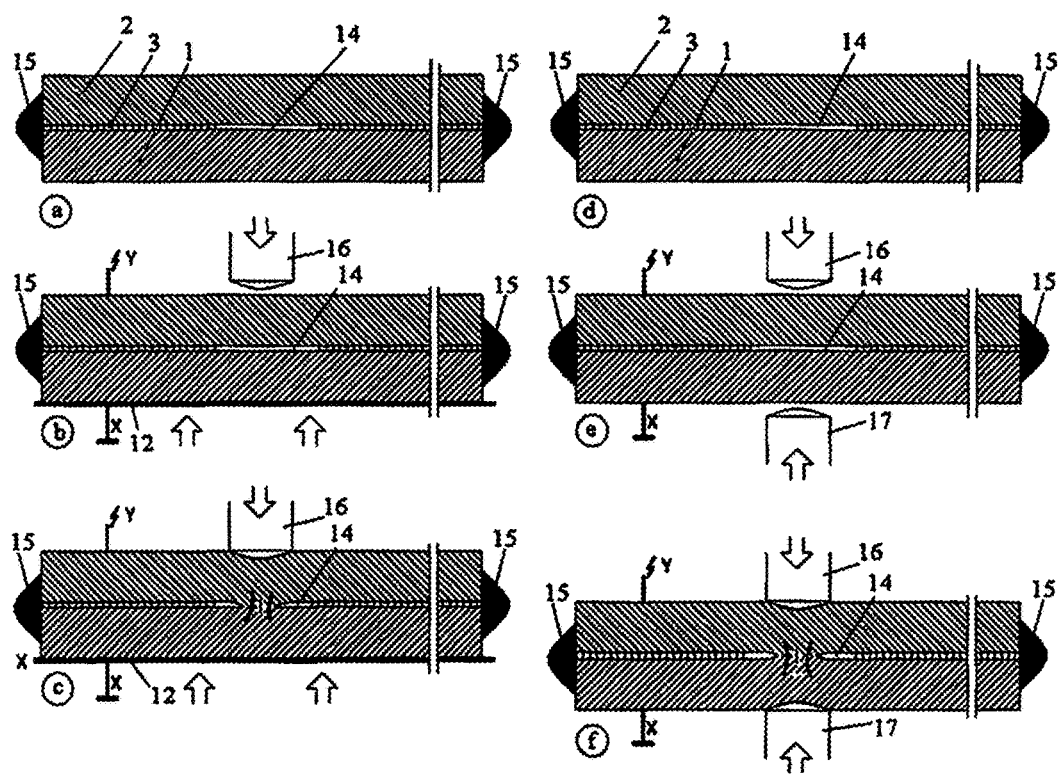

The method shown in FIGS. 2a-f and 3a-f comprises:
providing a first metal plate 1, an acoustic insulation layer 3 and a second metal plate 2 (FIGS. 2a, 2d, 3a en 3d).
providing electrical spot welding equipment (not explicitly shown) and then performing a spot welding action for each locally welded joint, wherein the first and the second metal plate 1 and 2 respectively are brought into electrical connection with a first and a second welding current connection X and Y respectively of the spot welding equipment; by using a single spot welding electrode 11 (FIGS. 2b and 3b-c) at the predetermined desired location of the welded connection. When using one local spot welding electrode 11 (welding current connection Y) for creating a spot weld, for example, a flat conductive bottom surface 12 serves as the second electrical connection (welding current connection X) of the current source of the spot welding equipment. When using two spot welding electrodes 11 and 13 (FIGS. 2e-f and 3e-f), the two spot welding electrodes 11, 13 are connected to connections X and Y respectively of the current source. In both cases (by using one as well as two spot welding electrodes) the first and second metal plate 1 and 2 respectively are locally pressed towards each other (see arrows) in such a way that mutual electrical contact is made, so that a local welding current occurs between the metal sheets, causing that both metal plates are welded together at those locations (FIGS. 2c, 2f, 3c en 3f).

In the embodiment as illustrated in FIGS. 2a-f when the metal plates are pressed together locally, the acoustic insulation layer is (essentially) pressed away, so that electrical contact is created locally between the two metal plates, and a welding current I flows, fed by the stud welding equipment, whereby the welded joint is formed. In order to enhance the creation of an electrical path between the two metal plates and through the acoustic intermediate layer 3, preferably an acoustic intermediate layer is used, which is more or less electrically conducting, at least at the predetermined location of the welded joint, for example by mixing conducting particles into the material of the acoustic insulation layer.

In an alternative embodiment, illustrated in FIGS. 3a-f, an acoustic insulation layer 3 is used, wherein the acoustic insulation layer comprises openings 14 at the predetermined location of the spot-welded joints. When the metal plates 1 and 2 by either the one spot electrode 11 and a flat surface 12, or by two spot electrodes 11 and 13 (and/or possibly by other pressure bodies or pressing means) are pressed together locally, both metal plates are brought into mutual electrical connection by means of the respective local openings 14, without having to press away locally the acoustic insulation layer 3 (in fact there the opening 14 is located in the acoustic insulation layer).

The FIGS. 4a-f illustrate the same effect as the second preferred embodiment of FIGS. 3a-f, however, in a slightly different embodiment: instead of one or two spot welding electrodes 11 and 13 respectively, the metal plates at the predetermined location of the welded joint are pressed together by one or two pressure members 16 and 17 respectively, both not serving as a welding electrode. The pressure members are electrically insulated with respect to each other, for example by using (hard) steel or ceramic (spot) pressure members respectively. Use of separate spot welding electrodes 11, 13 and pressure members 16, 17 may be advantageous, because consequently the functions of "compressing" (for obtaining of mechanical and therefore electrical contact between the metal sheets) and "current supply" (between the spot welding equipment and the locally pressed together metal sheets 1, 2) are separated from each other, which provides more freedom in, for example, the (auxiliary) constructions by which the process is carried out, as well as in materials used for the (relatively hard) pressure members and the (usually copper) spot welding electrodes.

Prior to providing the locally welded joints or after it, the outer edges of the two metal plates 1 and 2, whether or not integral, are welded to each other 15.

FIG. 5 shows a graph of the noise reduction d (dB) achieved by the invention as a function of the frequency f (Hz), as measured on a laminar aluminium plate having a thickness of 6 mm.

Accordingly, a method is provided for manufacturing a laminar construction panel with improved properties, both in terms of manufacture as well as in terms of—as is clear from experiments—the acoustic properties, while fully complying with the fire protection requirements.

The invention claimed is:

1. Method for manufacturing a laminar construction panel, said method comprising the following steps:
   connecting a first metal plate (1) to a second metal plate (2) by means of a number of spaced apart welded joints distributed over the laminar construction panel and which extend through an area of an intermediate acoustic insulation layer (3),
   forming the number of spaced apart welded joints by means of stud welding, the stud welding method comprising:
      providing said first metal plate (1), acoustic insulation layer (3) and second metal plate (2), wherein the second metal plate has welding openings (4) at locations where the spaced apart welded joints will be;
      providing electrical stud welding equipment or another suitable welding current source, of which a first welding current connection (5) is electrically connected to the first metal plate and/or the second metal plate, and the electrical stud welding equipment being provided with a welding pin (7) to be connected with a second welding current connection (6), the welding pin having a cross section smaller than a cross section of the welding openings (4);
      performing a stud welding action for each welding opening, the welding pin is inserted into the welding opening, subsequently pushed through the acoustic insulation layer, and pressed onto a metal surface of the first metal plate in such a way that a welding current flows through the welding pin and the first metal plate, thereby melting and joining together metal (8) of the welding pin and the first metal plate by that welding current, which stud welding action is continued until a space (9) between the welding pin and the welding opening is filled with molten metal (10) of the welding pin and the first and/or second metal plate.

2. Method according to claim 1, wherein the acoustic insulation layer comprises visco-elastic properties.

3. Method according to claim 1, wherein the welding openings in the second metal plate beforehand have been provided prior to combining the first and the second metal plate with the interposed acoustic insulation layer.

4. Method according to claim 1, wherein the welding openings in the second metal plate are provided after combining the first and second metal plate with the interposed acoustic insulation layer.

5. Method according to claim 1 wherein outer edges of the first and second metal plates are welded together (15), in full or in part.

6. A laminar construction panel manufactured by the method according to claim 1.

7. Method according to claim 1 wherein the space (9) is an annular space spanning an entire depth of the second metal plate, between the welding pin and the second metal plate.

* * * * *